US009487115B2

(12) United States Patent
Tachikawa

(10) Patent No.: US 9,487,115 B2
(45) Date of Patent: Nov. 8, 2016

(54) HEADREST HAVING A RECESS ON A BOTTOM THEREOF AND FACING THE HEAD OF A HEADREST GUIDE

(71) Applicant: TS TECH CO., LTD., Asaka-shi, Saitama (JP)

(72) Inventor: Yoichi Tachikawa, Shioya-gun (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 14/648,422

(22) PCT Filed: Dec. 4, 2012

(86) PCT No.: PCT/JP2012/081408
§ 371 (c)(1),
(2) Date: May 29, 2015

(87) PCT Pub. No.: WO2014/087488
PCT Pub. Date: Jun. 12, 2014

(65) Prior Publication Data
US 2015/0306995 A1    Oct. 29, 2015

(51) Int. Cl.
*B60N 2/48* (2006.01)
*B60N 2/58* (2006.01)

(52) U.S. Cl.
CPC ......... *B60N 2/4864* (2013.01); *B60N 2/4838* (2013.01); *B60N 2/4844* (2013.01); *B60N 2/4847* (2013.01); *B60N 2/5825* (2013.01); *B60N 2/5841* (2013.01); *B60N 2002/4888* (2013.01)

(58) Field of Classification Search
CPC  B60N 2/4864; B60N 2/4838; B60N 2/4805; B60N 2/4844; B60N 2/4847; B60N 2/5825; B60N 2/5841

USPC .................................................. 297/410, 408
See application file for complete search history.

(56) References Cited

U.S. PATENT DOCUMENTS

| 4,256,341 A | * | 3/1981 | Goldner ............... B60N 2/4817 297/408 |
| 4,693,515 A |   | 9/1987 | Russo et al. |
| 4,779,929 A | * | 10/1988 | Kuchemann ......... B60N 2/4817 297/391 |
| 4,858,994 A | * | 8/1989 | Yamashita ........... B60N 2/4838 297/391 |

(Continued)

FOREIGN PATENT DOCUMENTS

| CN | 102036586 A | 4/2011 |
| DE | 101 49 455 A1 | 4/2003 |
| EP | 0254808 A2 | 2/1988 |

(Continued)

OTHER PUBLICATIONS

Feb. 26, 2013 International Search Report issued in International Application No. PCT/JP2012/081408.

(Continued)

*Primary Examiner* — Milton Nelson, Jr.
(74) *Attorney, Agent, or Firm* — Oliff PLC

(57) ABSTRACT

A headrest is to be mounted to the top of a seat back with a headrest pillar and a headrest guide height-adjustably supporting the headrest pillar and being attached to the seat back such that the head of the headrest guide is exposed from the top of the seat back. The headrest includes a recess on a bottom of the headrest, the recess facing the head of the headrest guide. The surface of the recess is set to be separate from the head of the headrest guide.

8 Claims, 13 Drawing Sheets

(56) References Cited

U.S. PATENT DOCUMENTS

| | | | |
|---|---|---|---|
| 5,738,412 A * | 4/1998 | Aufrere | B60N 2/4847 297/216.12 |
| 6,290,298 B1 * | 9/2001 | Lee | B60N 2/4838 297/391 |

FOREIGN PATENT DOCUMENTS

| | | |
|---|---|---|
| EP | 0 582 765 A1 | 2/1994 |
| EP | 2 116 149 A1 | 11/2009 |
| JP | H06143307 A | 5/1994 |
| JP | 2011207335 A | 10/2011 |
| JP | 2012-201152 A | 10/2012 |

OTHER PUBLICATIONS

Jun. 3, 2016 Office Action issued in Chinese Application No. 201280078186.1.

Aug. 23, 2016 Office Action issued in Japanese Application No. 2014-550834.

* cited by examiner

HEADREST HAVING A RECESS ON A BOTTOM THEREOF AND FACING THE HEAD OF A HEADREST GUIDE

TECHNICAL FIELD

The present invention relates to a headrest.

BACKGROUND ART

Headrests of seats must be disposed at appropriate positions relative to the heads of the occupants of the seats to provide seating comfort and safety. To satisfy this requirement, some techniques have been developed involving the adjustment of the position of a headrest in the front-rear direction in addition to the height adjustment with headrest pillars (for example, refer to PTLs 1 and 2).

CITATION LIST

Patent Literature

PTL 1: Japanese Laid-Open Application Publication No. H06-143307
PTL 2: Japanese Laid-Open Application Publication No. 2011-207335

SUMMARY OF INVENTION

Technical Problem

The bottom of the headrest disclosed in PTL 1 is covered with a plate. Unfortunately, if such a headrest provided with the bottom plate and movable in the front-rear direction is applied to a vehicle seat disclosed in PTL 2, the bottom plate may come into contact with the heads of headrest guides, resulting in damages on the bottom plate and the heads of the headrest guides and/or abnormal noise.

An object of the invention is to provide a headrest that can suppress a damage or abnormal noise due to the contact between the headrest and the heads of headrest guides.

Solution to Problems

To solve the problem, a headrest according to embodiment 1 is the headrest to be mounted to a top of a seat back with a headrest pillar and a headrest guide that has a head, height-adjustably supports the headrest pillar, and is attached to the seat back such that a head of the headrest guide is exposed from the top of the seat back, and the headrest includes:

a recess on a bottom of the headrest, the recess facing the head of the headrest guide, wherein a surface of the recess is set to be separate from the head of the headrest guide.

The invention of embodiment 2 is the headrest according to embodiment 1, wherein the headrest is configured such that a position of the headrest is adjustable in a front-rear direction, and a path of the surface of the recess during a movement of the headrest in the front-rear direction is set to be separate from the head of the headrest guide.

The invention of embodiment 3 is the headrest according to embodiment 1 or 2, wherein the head of the headrest guide is accommodated in the recess.

The invention of embodiment 4 is the headrest according to any one of embodiments 1 to 3, including a headrest body comprising a shifting mechanism for moving the headrest in the front-rear direction relative to the headrest pillar; and a bottom cover disposed on the bottom of the headrest body, the bottom cover including the recess.

The invention of embodiment 5 is the headrest according to embodiment 4, including a covering material covering the headrest body, wherein the bottom cover is disposed to overlap the bottom of the headrest body in a state where an edge of the covering material is held between the bottom cover and the bottom of the headrest body.

The invention of embodiment 6 is the headrest according to embodiment 4 or 5, wherein the bottom of the headrest body has a first opening to introduce the headrest pillar into the headrest body, the bottom cover has a second opening aligned with the first opening such that the headrest pillar extends through the second opening, the bottom cover includes a tubular plug standing upwards from a peripheral edge of the second opening, the plug being inserted into the headrest body through the first opening, and the recess is disposed below the plug.

The invention of embodiment 7 is the headrest according to embodiment 6, wherein the headrest pillar includes a plurality of support posts, a plurality of the first openings are provided, the first openings being aligned with the respective support posts and provided in the bottom of the headrest body, a plurality of the second openings are provided, the second openings being aligned with the respective support posts and provided in the bottom cover, and a plurality of the plugs are provided, the plugs being aligned with the respective support posts and provided in the bottom cover.

The invention of embodiment 8 is the headrest according to embodiment 7, wherein the bottom cover further includes a reinforcing member between one plug and another plug.

The invention of embodiment 9 is the headrest according to embodiment 8, wherein the reinforcing member is disposed to reach peripheral edges of third openings in the respective upper portions of the tubular plugs.

The invention of embodiment 10 is the headrest according to any one of embodiments 7 to 9, wherein a plurality of the recesses are provided, and the bottom cover has a middle portion between one recess below the one plug and another recess below the another plug, the middle portion protruding from the bottom surfaces of the recesses of the bottom cover.

Advantageous Effects of Invention

According to the invention of embodiment 1, a damage or occurrence of abnormal noise due to the contact between the headrest and the head of the headrest guide is suppressed.

According to the invention of embodiment 2, interference with the head of the headrest guide during the front-rear movement of the headrest is suppressed. The headrest can thus avoid a damage or abnormal noise due to the contact between the headrest and the head of the headrest guide.

According to the invention of embodiment 3, the head of the headrest guide can be accommodated in the recess and thus an increase in the size of the headrest is suppressed.

According to the invention of embodiment 4, the head of the headrest guide can be accommodated in the recess of the bottom cover. The bottom cover can thus avoid a damage or abnormal noise due to the contact between the bottom cover and the head of the headrest guide while protecting and decorating the bottom of the headrest body.

According to the invention of embodiment 5, the edge of the covering material is sealed between the bottom cover and the bottom of the headrest body when a resin, such as urethane, functioning as a cushion pad is filled in a space therebetween.

According to the invention of embodiment 6, the first opening, the second opening, the plug, and the recess of the bottom cover are aligned and thus troubles are hardly caused during the mounting of the bottom cover onto the bottom of the headrest body and the front-rear movement of the headrest body.

According to the invention of embodiment 7, even if a headrest pillar includes a plurality of the support posts, the first openings, the second openings, the plugs, and the recesses of the bottom cover are aligned respectively and thus troubles are hardly caused during the mounting of the bottom cover onto the bottom of the headrest body and the front-rear movement of the headrest body.

According to the invention of embodiment 8, the reinforcing member reinforces the portion of the bottom cover between the one plug and the other plug and can thus increase the rigidity of the bottom cover.

According to the invention of embodiment 9, the reinforcing member reinforces the plugs and can thus increase the rigidity of a larger area of the bottom cover.

According to the invention of embodiment 10, if the headrest body is moved downward so as to be brought into contact with the top of the seat back for height adjustment and is pushed against the seat back, the middle portion between the one recess and the another recess first comes into contact with the top of the seat back, thus reducing the risk of contact between the bottom surfaces of the recesses and the heads of the headrest guides.

DESCRIPTION OF EMBODIMENTS

Figure 1:
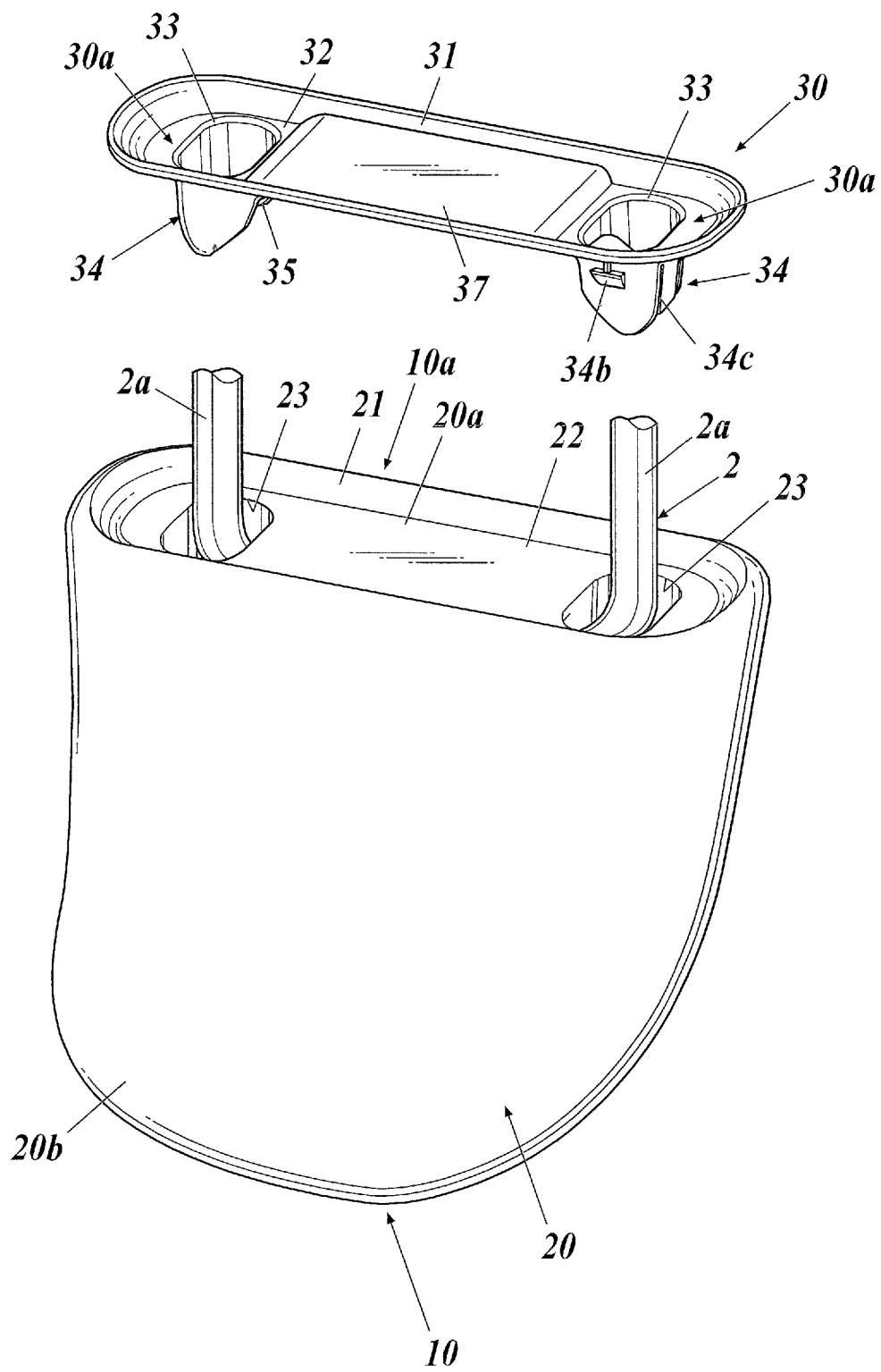
FIG. 1 is a perspective view of a headrest that includes a headrest body and a bottom cover and is inverted such that the bottom of the headrest faces upward.

Embodiments of the present invention will now be described with reference to the accompanying drawings.

With reference to FIGS. 1 to 4, a headrest 10 according to an embodiment is mounted on the top of a seat back 1 with a headrest pillar 2 and headrest guides 3 height-adjustably supporting the headrest pillar 2 and being attached to the seat back 1 such that the heads of the headrest guides 3 are exposed from the top of the seat back 1.

The headrest 10 has recesses 30a facing the respective heads 3a of the headrest guides 3 on the bottom 10a of the headrest 10. The surfaces of the recesses 30a are configured to be separate from the heads 3a of the headrest guides 3 during the front-rear movement.

The headrest 10 is configured as being movable for adjustment of the position thereof in the front-rear direction. The paths of the surfaces of the recesses 30a during the front-rear movement are configured to be separate from the heads 3a of the headrest guides 3. The heads 3a of the headrest guides 3 are accommodated in the respective recesses 30a.

The following description focuses on the configuration of each component.

Figure 3:
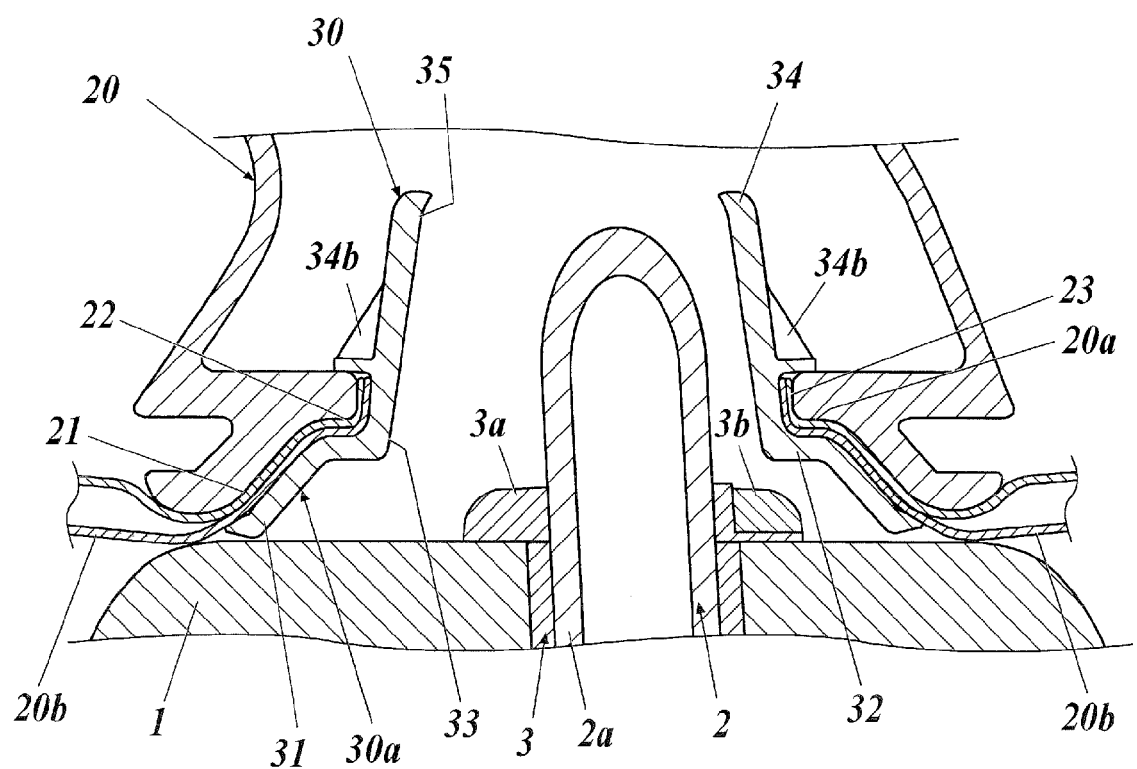
FIG. 3 is a cross sectional view of the lower portion of a headrest and the top of a seatback.
Figure 4:
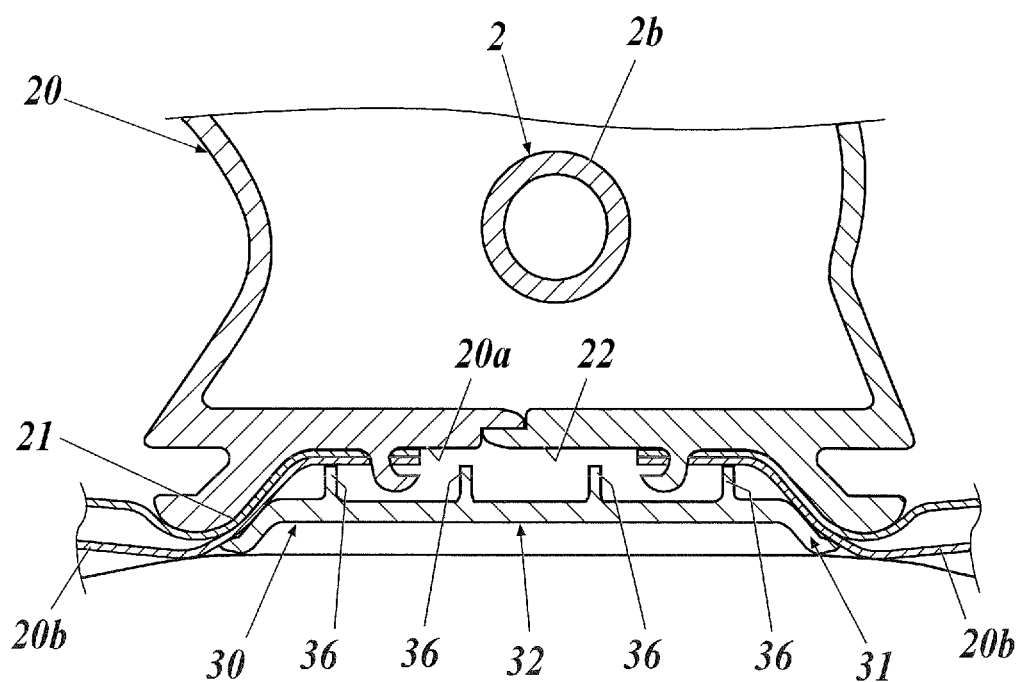
FIG. 4 is a cross sectional view of the lower portion of a headrest and the top of a seatback.

The seat back 1 illustrated in FIGS. 3 and 4 is tiltably supported at the rear end of a seat cushion for supporting the hip and thighs of an occupant, and supports the back of the occupant.

The seat back 1 includes a seat back frame (not shown) functioning as a base frame; a back pad that is composed of an elastically deformable material, such as urethane, and covers the seat back frame; and a covering material covering the back pad.

The seat back frame includes right and left side frames and a top frame coupling the tops of the right and left side frames to each other.

The headrest guides 3 are composed of a resin, for example. The headrest guides 3 each have a hollow cylindrical shape such that the headrest pillar 2 can extend through the headrest guide 3, as illustrated in FIGS. 3 and 4.

The headrest guides 3 are fixed to the top frame segment in the seat back 1. A pair of headrest guides 3 is used in the present embodiment.

The heads 3a of the headrest guides 3 each have a larger diameter than that of the portion of the headrest guide 3 fixed to the top frame in the seat back 1, and is exposed from the top of the seat back 1.

With reference to FIGS. 1, 3, and 4, the headrest pillar 2 is inserted into the hollow portions of the headrest guides 3 and is height-adjustably supported by the headrest guides 3.

According to the present embodiment, the headrest pillar 2 includes a pair of right and left support posts 2a separate from each other, and a horizontal segment 2b integrally coupled between the heads of the support posts 2a.

Although the headrest pillar 2 includes the support posts 2a and the horizontal segment 2b in the embodiment, this configuration should not be construed to limit the invention. The headrest pillar 2 may alternatively include a single support post 2a.

With reference to FIG. 1, the headrest 10 includes a headrest body 20 including a shifting mechanism (described below) for moving the headrest 10 in the front-rear direction relative to the headrest pillar 2, and a bottom cover 30 that is mounted on the bottom 20a of the headrest body 20 and includes the recesses 30a.

The headrest body 20 serves as an internal frame of the headrest 10 and is covered with a covering material 20b. The space between the headrest body 20 and the covering material 20b is filled with a resin, such as urethane, functioning as a cushion pad.

The edges of the covering material 20b are sealed on the bottom 20a of the headrest body 20 to prevent leakage of the resin, such as urethane.

According to the present embodiment, the bottom 20a of the headrest body 20 has an inclined surface 21 extending obliquely upward from the lower edge of the bottom 20a and a ceiling surface 22 adjoining the upper edge of the inclined surface 21. The bottom 20a thus has a substantially mortar shape, which faces downward to be mounted to the seat back 1. In other words, the bottom 20a is recessed toward the interior of the headrest body 20.

The ceiling surface 22 has first openings 23 to introduce the pair of support posts 2a of the headrest pillar 2 into the headrest body 20. According to the present embodiment, the ceiling surface 22 has a pair of first openings 23 aligned with the respective support posts 2a of the headrest pillar 2. In specific, the first openings 23 are respectively disposed in right and left end portions of the bottom 20a.

Figure 2:
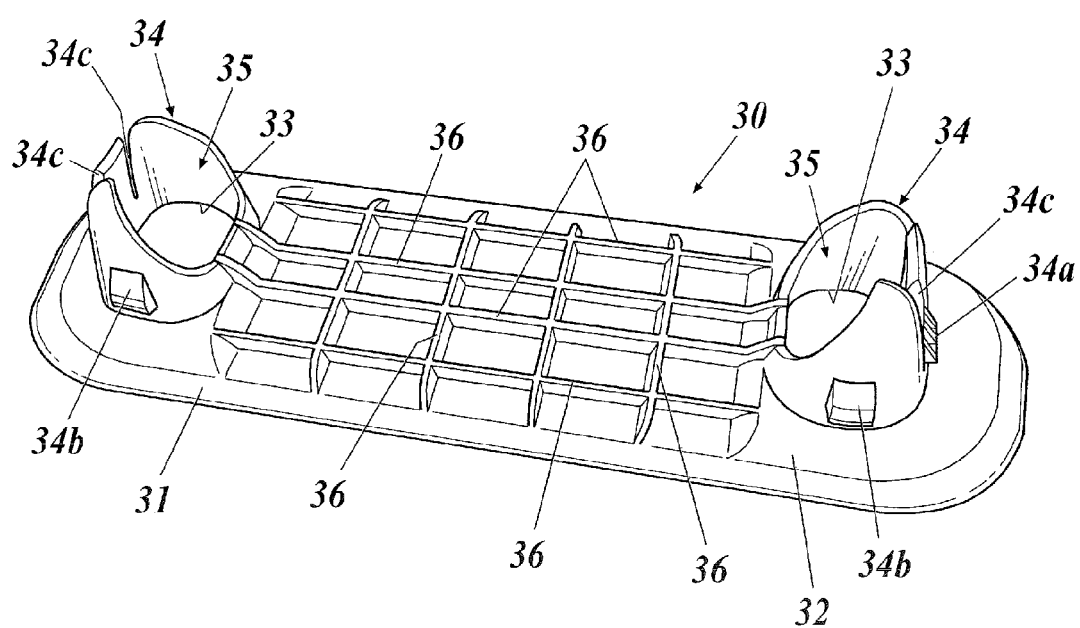
FIG. 2 is a perspective view of a bottom cover.

With reference to FIGS. 1 and 2, the bottom cover 30 is mounted on the bottom 20a of the headrest body 20 and includes the recesses 30a. The bottom cover 30 covers and decorates the bottom 20a of the headrest body 20.

With reference to FIGS. 3 and 4, the bottom cover 30 overlaps the bottom 20a of the headrest body 20 such that edges of the covering material 20b covering the headrest body 20 are held between the bottom cover 30 and the bottom 20a.

The bottom cover 30 has a substantially mortar shape, i.e., is recessed toward the interior of the headrest body 20, like the bottom 20a of the headrest body 20. The substantially mortar shape of the bottom cover 30 is defined by an inclined-surface abutting segment 31 and a ceiling-surface abutting segment 32 included therein.

The substantially mortar shape of the bottom cover 30 faces downward to be mounted to the seat back 1, like the headrest body 20. In the simplest terms, the recesses 30a according to the present embodiment respectively indicate the mortar-shaped portions of the bottom cover 30.

The inclined-surface abutting segment 31 extends along the peripheral edge of the bottom cover 30, and is inclined at an angle substantially equal to the angle of the inclined surface 21 of the bottom 20a of the headrest body 20. The inclined-surface abutting segment 31 comes into contact with the inclined surface 21 from below during the mounting of the bottom cover 30 on the bottom 20a.

The ceiling-surface abutting segment 32 adjoins and is surrounded by the inclined-surface abutting segment 31 in the bottom cover 30, and is parallel to the ceiling surface 22 of the bottom 20a of the headrest body 20. The ceiling-surface abutting segment 32 comes into contact with the ceiling surface 22 from below during the mounting of the bottom cover 30 on the bottom 20a.

The ceiling-surface abutting segment 32 has a pair of second openings 33 in right and left end positions aligned with the respective first openings 23, such that the support posts 2a of the headrest pillar 2 extend through the respective second openings 33. The positions of the second openings 33 are aligned with the respective support posts 2a, like the positions of the first openings 23.

The bottom cover 30 includes tubular plugs 34 that stand upward from the respective peripheral edges of the second openings 33 and are inserted in the headrest body 20 through the respective first openings 23.

The plugs 34 are formed to be aligned with the respective support posts 2a, like the first openings 23 and the second openings 33.

The tubular plugs 34 each have an inward third opening 35 that conforms to the horizontal segment 2b of the headrest pillar 2. In other words, the third openings 35 are disposed so as to face each other.

The plugs 34 each have integrated multiple engaging claws 34a and 34b on the outer surface. In the engaging claws 34a and 34b, the engaging claws 34a are respectively adjacent to the right and left ends of the bottom cover 30, and have flexibility due to slits 34c of the plugs 34 formed on both sides of the engaging claws 34a.

The engaging claws 34b are disposed on both sides of each plug 34 in the front-rear direction of the seat.

The engaging claws 34a and 34b of the plugs 34 inserted in the respective first openings 23 engage with the internal side surface of the ceiling surface 22 of the headrest body 20. The engaging claws 34a, which have flexibility as described above, can be warped during the insertion of the plugs 34. This feature facilitates the insertion of the plugs 34 in the respective first openings 23. The plugs 34 can be readily warped with the third openings 35 and the slits 34c. This feature also facilitates the insertion of the plugs 34 in the respective first openings 23.

The bottom cover 30 can be mounted to the headrest body 20 by inserting the plugs 34 in the respective first openings 23.

The bottom cover 30 and the bottom 20a of the headrest body 20 can hold the edges of the covering material 20b therebetween. In other words, the bottom cover 30 and the bottom 20a collectively serve as a sealing structure for the filling resin, such as urethane, in the space between the headrest body 20 and the covering material 20b.

In specific, the outer periphery of the bottom 20a of the headrest body 20 can be sealed with the peripheral edge of the bottom cover 30. The peripheries of the respective first openings 23 in the bottom 20a of the headrest body 20 can be sealed with the portions of the ceiling-surface abutting segment 32 around the respective plugs 34.

The bottom cover 30 further includes a reinforcing member 36 provided between one plug 34 and the other plug 34.

The reinforcing member 36 according to the present embodiment consists of multiple ribs integrally formed on the ceiling-surface abutting segment 32. According to the embodiment, the ribs 36 are arranged in a lattice pattern in a large area of the upper surface of the ceiling-surface abutting segment 32 between the plugs 34.

Some of the ribs 36 lying between the one plug 34 and the other plug 34 reach the peripheral edges of the third openings 35 in the plugs 34 and can thus reinforce the plugs 34.

The bottom cover 30 has a portion 37 (hereinafter referred to as "middle portion 37") between one recess 30a below the one plug 34 and the other recess 30a below the other plug 34. The middle portion 37 protrudes form the bottom surfaces of the recesses 30a (i.e., the lower surface of the ceiling-surface abutting segment 32) of the bottom cover 30.

In other words, the recesses 30a of the bottom cover 30 each being defined as a substantially mortar shaped concave space, in spaces surrounded by the inclined-surface abutting segment 31 and the ceiling-surface abutting segment 32, are separated into the left and right sides by the middle portion 37. Namely, two concave spaces below the respective plugs 34 and the respective second openings 33 are configures as the recesses 30a. The two recesses 30a serve as accommodating units for accommodating the respective heads 3a of the headrest guides 3.

The bottom of the middle portion 37 is disposed above the bottom of the inclined-surface abutting segment 31.

The recesses 30a, which serve as accommodating units, are formed so as to be larger than the respective heads 3a of the headrest guides 3.

The length of each recess 30a in the front-rear direction is set to be larger than the length of the corresponding head 3a of the headrest guide 3 in the front-rear direction in view of operations of the shifting mechanism. In specific, the inclined-surface abutting segment 31 has front and rear portions on the front and rear sides of the recesses 30a. The distance between the front and rear portions of the inclined-surface abutting segment 31 is adjusted to prevent contact between the inclined-surface abutting segment 31 and the heads 3a of the headrest guides 3 while the headrest body 20 is moved in the front-rear direction by the shifting mechanism.

This configuration can reduce the risk of contact between the surfaces of the recesses 30a and the heads 3a of the headrest guides 3 during the front-rear movement of the headrest body 20.

The depth of the recesses 30a in the vertical direction is set to be larger than the height of the heads 3a of the headrest guides 3. In other words, the vertical height from the bottom of the inclined-surface abutting segment 31 to the ceiling-surface abutting segment 32 is set to be larger than the height of the heads 3a of the headrest guides 3.

The bottom cover 30 thus comes into contact with the top of the seat back 1 before reaching the heads 3a of the headrest guides 3 during the height adjustment in which the headrest body 20 is moved along the support posts 2a of the headrest pillar 2. This configuration can reduce the risk of contact between the bottom cover 30 and the heads of the headrest guides 3.

As illustrated in FIG. 3, a concave step (clearance) 3b is provided to a portion of the head 3a of each headrest guide 3, which portion is adjacent to the ceiling-surface abutting segment 32, i.e., overlaps with the ceiling-surface abutting segment 32 in the vertical direction. The concave steps 3b can prevent interference between the ceiling-surface abutting segment 32 and the heads 3a of the headrest guides 3.

(Headrest Body 20 and Shifting Mechanism)

The following description focuses on the headrest body 20 and the shifting mechanism.

The headrest body 20 according to the present embodiment is formed to be hollow and includes the shifting mechanism therein.

Figure 5:
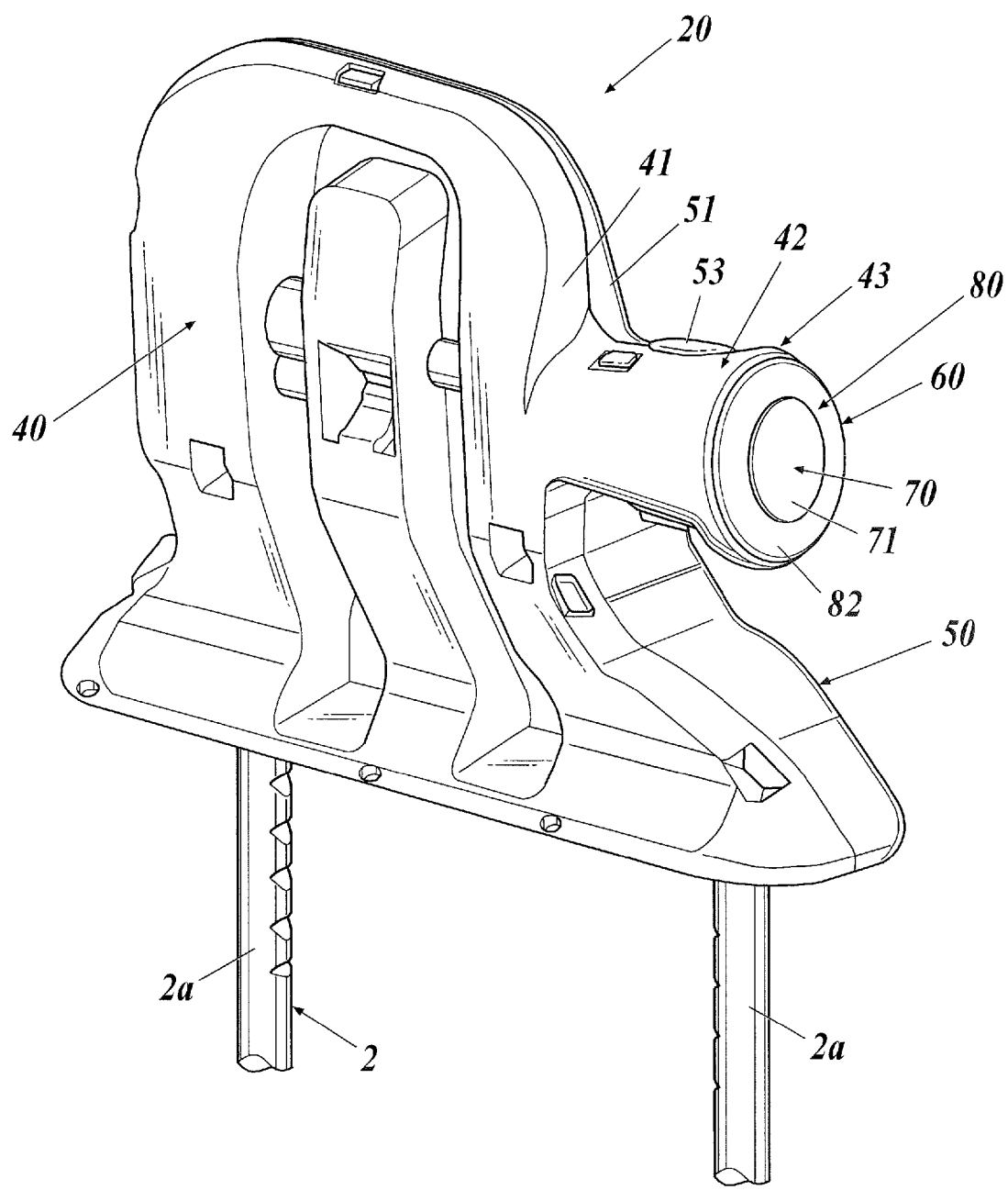
FIG. 5 is a perspective view of a front segment of a headrest body.
Figure 6:
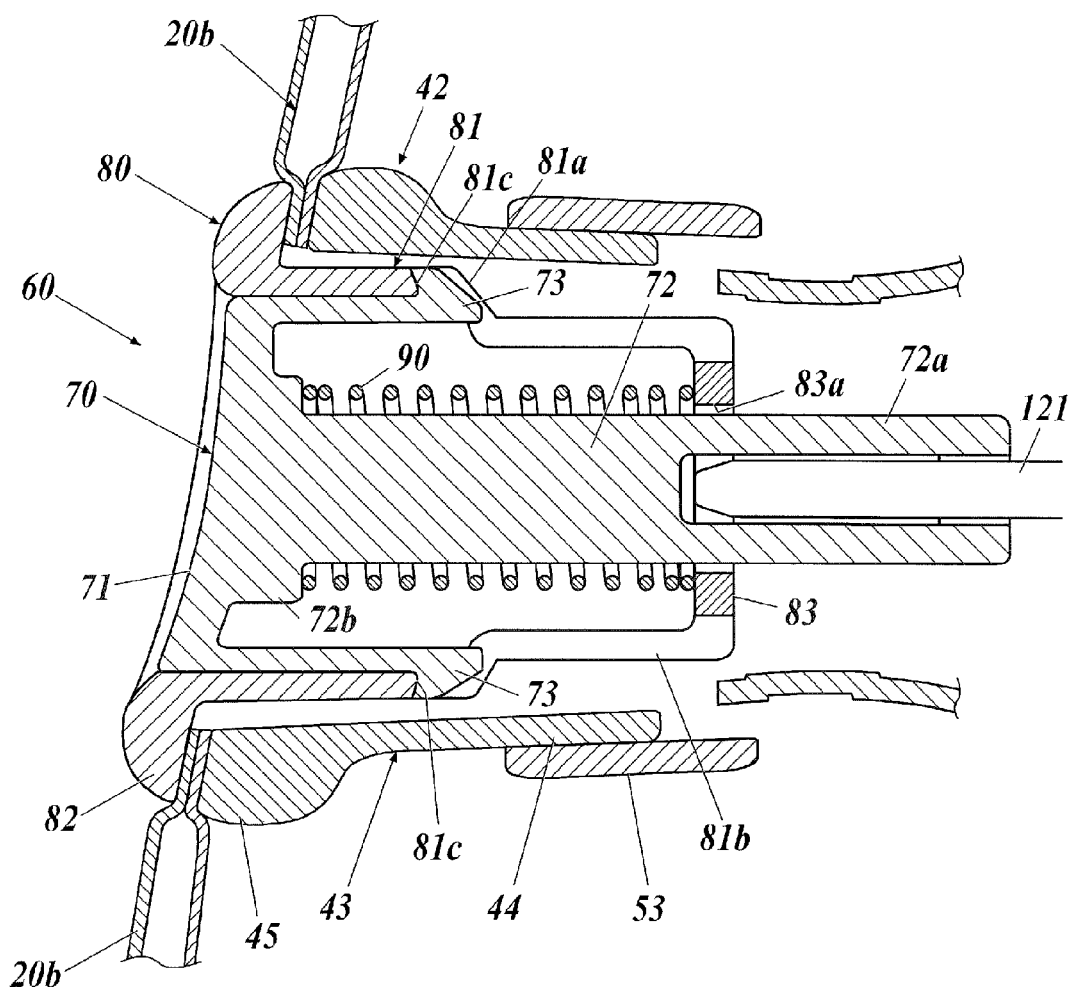
FIG. 6 is a cross sectional view of a structure around a button.
Figure 7:
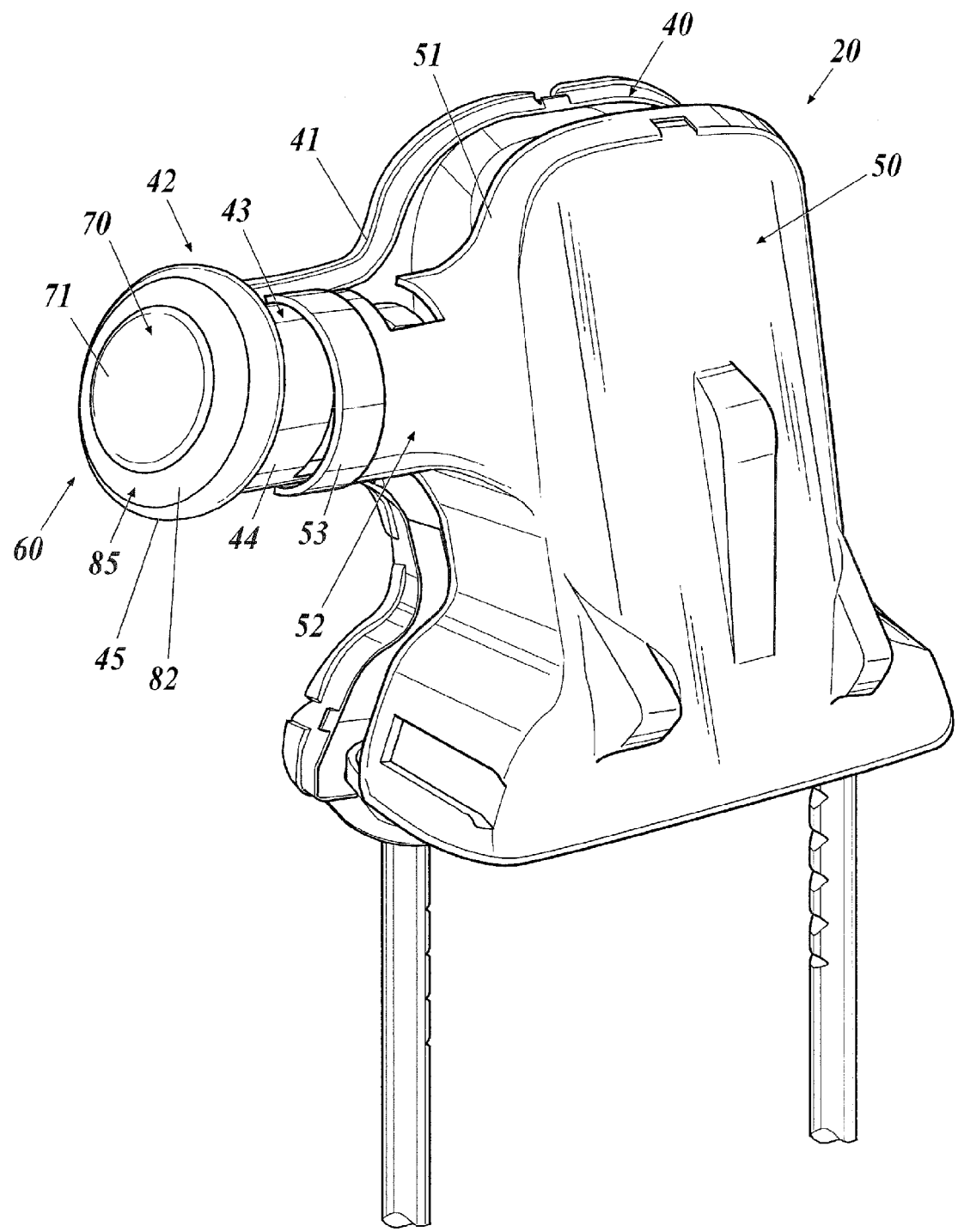
FIG. 7 is a perspective view of a headrest body immediately before the mounting of a rear segment to a front segment.

With reference to FIGS. 5 to 7, the headrest body 20 includes a front segment 40 attached to the horizontal segment 2b of the headrest pillar 2 such that the front segment 40 is pivotable in the front-rear direction, a rear segment 50 mounted to the rear of the front segment 40 such that the rear segment 50 and the front segment 40 surround the shifting mechanism, and a button 60 used for the operation of the shifting mechanism and exposed to the external surface of the headrest 10.

The front segment 40 and the rear segment 50 have fitting structures and thus engage with each other along the peripheral edges. The front segment 40 and the rear segment 50 which are fitted together and assembled define an internal space therebetween.

With reference to FIGS. 5 and 6, the front segment 40 has a peripheral wall 41 having an integrated button holder 42 that holds the button 60 and protrudes in the horizontal direction.

With reference to FIG. 7, the button holder 42 has a hollow reception cylinder 43 at the tip in the protruding direction. The reception cylinder 43 receives the button 60. The base end portion of the button holder 42 in the protruding direction, i.e., the end adjoining the peripheral wall 41, is formed to be continuous to the peripheral wall 41.

The reception cylinder 43 includes a cylinder body 44 and a flange 45, which adjoins the outer peripheral edge of the cylinder body 44 and has a larger diameter than that of the opening of the reception cylinder 43.

With reference to FIGS. 5 to 7, the rear segment 50 has a peripheral wall 51 having an integrated holder cover 52 that protrudes in the horizontal direction and covers the rear of the button holder 42 of the front segment 40.

With reference to FIG. 7, the holder cover 52 has a semitubular shape and includes a holder cover body 53 covering the rear of the cylinder body 44 of the reception cylinder 43. The holder cover body 53 has a circular-arc shape having a central angle larger than 180° so as to cover upper and lower portions of the cylinder body 44 on the front side.

With reference to FIGS. 5 and 6, the button 60 is inserted into the opening of the reception cylinder 43 of the button holder 42. The button 60 enables the operation of the shifting mechanism.

The button 60 includes a button body 70 attached to the button-side tip of a supported segment 121 of a locking member 120, and a button retainer 80 that is attached to the button holder 42 and movably retains the button body 70.

The button retainer 80 is passed through the opening of the reception cylinder 43 toward the inside of the headrest body 20. The button retainer 80 includes a hollow cylinder 81, a flange 82, and an internal side wall 83.

The button retainer 80 is fitted to the button holder 42 with their fitting structures such that they engage with each other.

The cylinder 81 has a step 81a at or around the center thereof in the longitudinal direction from the outer side to the inner sides of the headrest body 20. The segment of the cylinder 81 which is positioned more exterior than the step 81a has a larger diameter than the segment of the cylinder 81 which is positioned more interior than the step 81a.

The cylinder 81 has multiple slits 81b extending from the step 81a to the internal side wall 83, which is positioned more interior than the step 81a. The slits 81b are spaced from each other in the circumferential direction of the cylinder 81.

The flange 82 adjoins the outer peripheral edge of the cylinder 81 and has a diameter substantially equal to that of the flange 45 of the reception cylinder 43.

Substantially the same diameters of the flange 82 and the flange 45 of the reception cylinder 43 can prevent the button retainer 80 from entirely entering into the reception cylinder 43.

The flange 82 and the flange 45 of the reception cylinder 43 can clip the edge of the covering material 20b covering the headrest body 20 that is adjacent to the button 60. In other words, the flanges 45 and 82 serve as a sealing structure for filling resin, such as urethane, functioning as a cushion pad in the space between the headrest body 20 and the covering material 20b.

The internal side wall 83, which corresponds to the bottom of the cylinder 81, has a through hole 83a in the center such that a protrusion 72 (described below) of the button body 70 extends through the through hole 83a.

A portion of the internal side wall 83 between the through hole 83a and the slits 81b is in contact with a biasing member 90 (described below).

The button body 70 is inserted into the cylinder 81 of the button retainer 80 and can move along the cylinder 81.

The button body 70 includes a button face 71, a protrusion 72, and engaging members 73.

The button face 71 is directly touched by an operator during operation through the button 60.

The protrusion 72 protrudes from the rear of the button face 71 toward the interior of the headrest body 20. The protrusion 72 has a retaining portion 72a on the protruding side to retain the button-side tip of the supported segment 121 of the locking member 120. The protrusion 72 further has a step 72b at the base end thereof in the protruding direction having a larger diameter than that of the other portions of the protrusion 72. The step 72b is in contact with the biasing member 90 (described below).

The button face 71 is curved. In specific, the external side surface (i.e., button face 71) of the button body 70 has a curved recess in the position facing the step 72b. This configuration can improve the operability of the button body 70. The step 72b can suppress a reduction in the rigidity due to the curved recess of the external side surface of the button body 70.

A plurality of the engaging members 73 are provided corresponding to a plurality of the slits 80, and each engaging member protrudes from the peripheral edge of the button face 71 toward the interior of the headrest body 20.

The engaging members 73 each have a claw-shaped tip, which can engage with the end 81c of each slit 81b in the cylinder 81. The engaging members 73 thus engage with the cylinder 81. This configuration can prevent extraction of the button body 70 from the button retainer 80.

The engaging members 73 are slidable along the respective slits 81b in response to a button operation.

The biasing member 90 is disposed between the button body 70 and the button retainer 80. After the button 60 and the supported segment (coupling unit) 121 are operated to move an engaging segment 122 of a locking mechanism (described below), the biasing member 90 returns the button 60 to the initial position.

In specific, the biasing member 90 according to the embodiment is a compression coil spring. The protrusion 72 of the button body 70 extends through the compression spring 90. The compression spring 90 is in contact with the internal side wall 83 at an end and with the step 72b of the protrusion 72 at the other end. To place the compression spring 90 in the position illustrated in FIG. 6, the compression spring 90 is provided around the protrusion 72 before the insertion of the button body 70 into the cylinder 81 of the button retainer 80, and the button 70 is then inserted into the cylinder 81 of the button retainer 80.

The compression spring 90 is in a state of being disposed closer to the button 60 than a locking bracket 100 (described below) of the shifting mechanism.

The step 72b has a larger outer diameter than that of the compression spring 90 and can thus stably support the compression spring 90.

The compression spring 90 faces and is surrounded by the cylinder 81 functioning as a restrictor for regulating a radial movement of the compression spring 90.

An outer end surface (the bottom surface) of a hole for receiving the supported segment 121, which hole is provided in the retaining portion 72a of the protrusion 72, is more exterior than the inner end surface of the internal side wall 83. This configuration can contribute to a suppression of an increase in the size of the headrest 10. If the hole is so deep that it overlaps with the compression spring 90 in the radial direction, the size of the headrest 10 can be further suppressed.

The compression spring 90 can return the supported segment 121 to the initial position after the button body 70 of the button 60 is pushed to move the supported segment 121 and thus the engaging segment 122. In other words, the supported segment 121 and the button body 70, which moves together with the supported segment 121, can be returned to the respective initial positions. Thus, the engaging segment 122 can be also returned to the initial position. This configuration allows the engaging segment 122 to be repeatedly operated with the button body 70.

In such a configuration around the button 60 in the headrest body 20, the compression spring (biasing member) 90 for returning the button body 70 to the initial position can be disposed adjacent to the button 60. This configuration can improve the accuracy of returning the button body 70 to the initial position, and can thus prevent backlash during the button operation. The compression spring 90, which is disposed between the button retainer 80 attached to the button holder 42 and the button body 70 movably retained by the button retainer 80, more directly applies biasing force to the button body 70. The compression spring 90 can thus further improve the accuracy of returning the button body 70 to the initial position, thereby suppressing rattling during the button operation more effectively.

This configuration can satisfy the requirement for an improvement in the accuracy of returning the button to the initial position and the suppression of rattling during the button operation.

With reference to FIGS. 8 to 13, the shifting mechanism according to the present embodiment includes a locking mechanism for locking the headrest body 20 in one of several positions in the front-rear direction relative to the locking bracket 100, and a guiding mechanism for guiding the headrest body 20 to move in the front-rear direction.

The front-rear movement of the headrest body 20 indicates the above-described pivoting of the headrest body 20 in the front-rear direction. The locking mechanism can lock the headrest body 20 in one of the several positions the pivoting direction.

Figure 8:
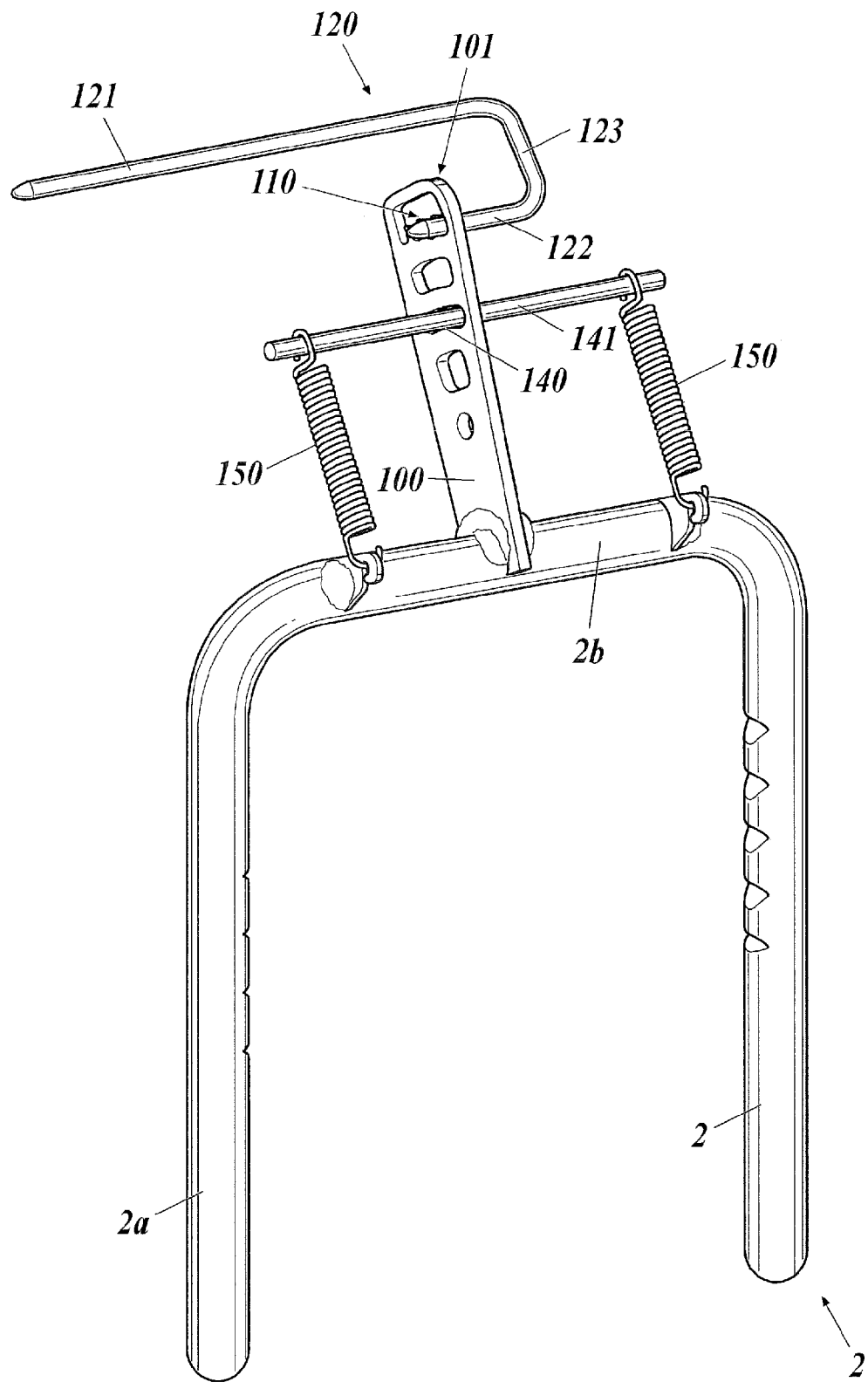
FIG. 8 is a perspective view of the main configuration of a shifting mechanism.
Figure 9:
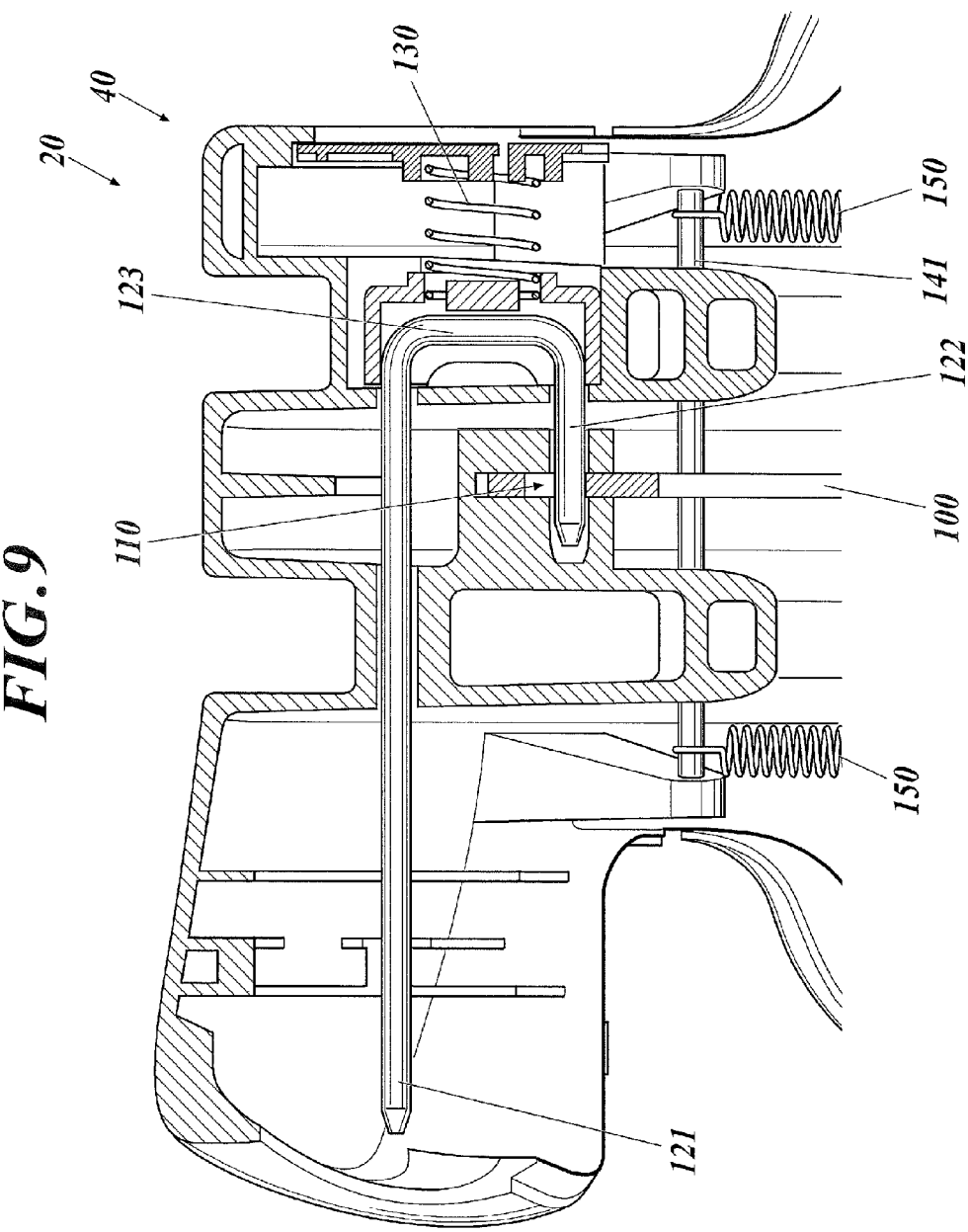
FIG. 9 is a cross sectional view of the main configuration of a shifting mechanism.

With reference to FIG. 8, the horizontal segment 2b of the headrest pillar 2 supports the locking bracket 100. The locking bracket 100, which constitutes the locking mechanism, is fixed to the horizontal segment 2b at the base end, protrudes upward, and is inclined forward.

The middle portion 37 of the bottom cover 30 facing the locking bracket 100 is positioned lower than the recesses 30a, and thus does not interfere with the locking bracket 100.

The locking mechanism includes a ratchet 110, a locking member 120, and a biasing means 130. The locking mechanism can lock the headrest body 20 in a predetermined position and unlock the headrest body 20.

The guiding mechanism includes a guide recess 140 and a guide member 141.

The headrest pillar 2, the locking bracket 100, and the headrest body 20 further include other components required for operating the locking and guiding mechanisms or facilitating the operations of the locking and guiding mechanisms.

With reference to FIGS. 8 and 10 to 13, the ratchet 110 of the locking mechanism resides at the distal end 101 of the locking bracket 100. The ratchet 110 includes multiple engaging teeth 111 and multiple grooves 112 alternately arranged along the moving direction of the headrest body 20.

The locking member includes a supported segment 121 supported by the headrest body 20 and disposed in the right-left direction, an engaging segment 122 disposed parallel to the supported segment 121 to engage with one of the engaging teeth 111 in response to a movement of the headrest body 20, and a middle segment 123 coupling the supported segment 121 to the engaging segment 122.

The button-side tip of the supported segment 121 is attached to the button body 70 of the button 60. The supported segment 121 can move in the right-left direction, i.e., the longitudinal direction of the supported segment 121, in response to a movement of the button 60 along operating (pushing) direction, while being supported by the headrest body 20.

The engaging segment 122 can accordingly move in the right-left direction, i.e., the longitudinal direction of the engaging segment 122. In specific, the supported segment 121 serves as a coupling unit for coupling the engaging segment 122 to the button 60 and operating in response to a movement of the button 60.

Such a movable engaging segment 122 is moved toward the ratchet 110 to engage with one of the engaging teeth 111, so that the headrest body 20 can be locked in one of the several positions in the front-rear direction relative to the locking bracket 100.

The headrest body 20 can be unlocked by moving the engaging segment 122 toward the direction opposite to the ratchet 110 for disengagement from the engaging tooth 111.

The biasing means can apply the biasing force toward the engaging teeth 111 and the rotational biasing force to the locking member 120.

The biasing means consists of a helical torsion coil spring 130, which functions both as a compression spring for pushing back the locking member 120 moving in the longitudinal direction of the supported segment 121 in response to the operation of the button 60 and as a torsion spring for turning the engaging segment 122 around the supported segment 121 and urging the engaging segment 122 against the bottom of a concave groove 112. In other words, the helical torsion coil spring 130 has two functions.

The helical torsion coil spring 130 is attached to the middle segment 123 of the locking member 120 at one end and to the headrest body 20 at the other end, while being twisted to apply the rotational biasing force to the locking member 120.

With reference to FIGS. 8 and 10 to 13, the guide recess 140 of the guiding mechanism is formed on a side surface of the locking bracket 100 along the moving direction of the headrest body 20.

According to the embodiment, the guide recess 140 is formed so as to penetrate through the locking bracket 100 in the right-left (thickness) direction; hence, the guide recess 140 and the ratchet 110 are in the same plane vertical to the horizontal plane.

The guide member 141, which is composed of a metal shaft, engages with the guide recess 140 while being supported by the headrest body 20, and moves along the guide recess 140 in response to a movement of the headrest body 20.

According to the embodiment, the guide member 141 is passed through the guide recess 140, which is formed so as to penetrate through the locking bracket 100.

Furthermore, biasing members 150 are provided between the horizontal segment 2b of the headrest pillar 2 and the respective ends of the guide member 141. The biasing members 150 urge the guide member 141 toward the horizontal segment 2b.

In other words, the biasing members 150 can apply the biasing force that pulls back the headrest body 20 that has moved forward.

The operation of the above-described headrest will now be explained.

As shown in FIGS. 10 to 13, the principle of the operation of the headrest is the pivoting of the headrest body 20 in the front-rear direction, which is attached to the horizontal segment 2b of the headrest pillar 2 so as to be pivotable in the front-rear direction.

Figure 10:
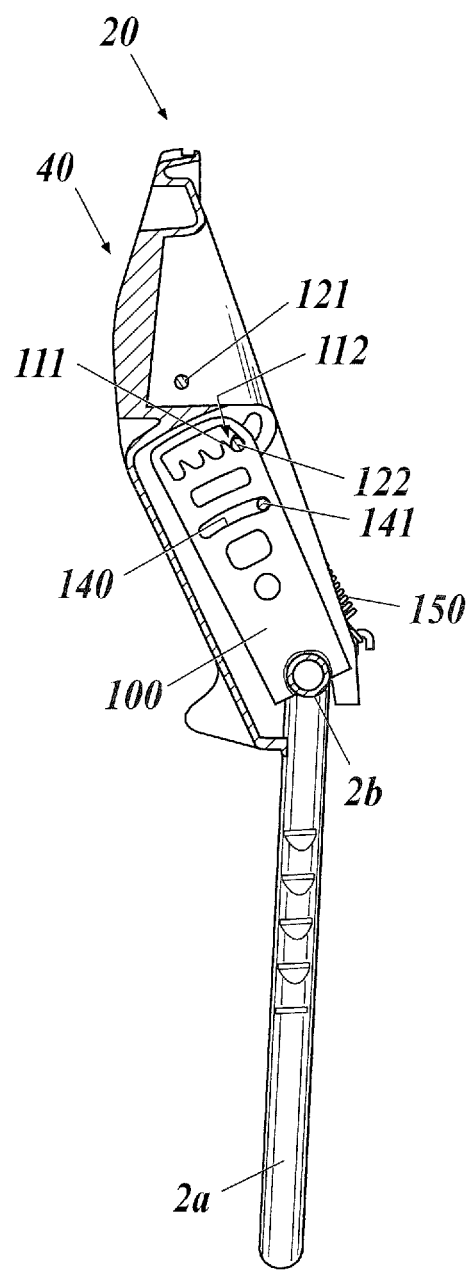
FIG. 10 illustrates one mode of a front segment of a headrest body during operation.

The headrest body 20 is urged toward the horizontal segment 2b by the biasing members 150. FIG. 10 illustrates the headrest body 20 in the normal position. In this position, the headrest body 20 is pulled backward, and the engaging segment 122 of the locking member 120 is inserted into the rearmost concave groove 112 of the ratchet 110 and engages with the rear end of the ratchet 110.

To move the headrest body 20 forward from the normal position, an operator applies force to the headrest body 20 to tilt it forward.

Figure 11:
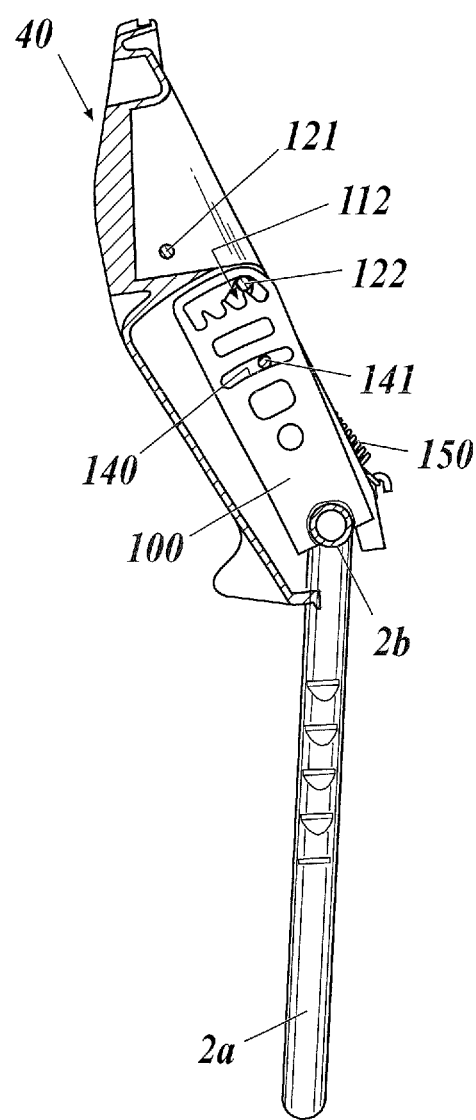
FIG. 11 illustrates another mode of the front segment of the headrest body during operation.

The engaging segment 122 then leaves the bottom of the rearmost concave groove 112 and slides upward along the rear surface of the rearmost engaging tooth 111 while remaining in the ratchet 110, as illustrated in FIG. 11.

The engaging segment 122 ascends against the rotational biasing force of the helical torsion coil spring 130. This operation increases the biasing force applied to the engaging segment 122.

The engaging segment 122 slides and moves upward along the rear surface of the rearmost engaging tooth 111, and then reaches the upper edge of the rearmost engaging tooth 111.

Figure 12:
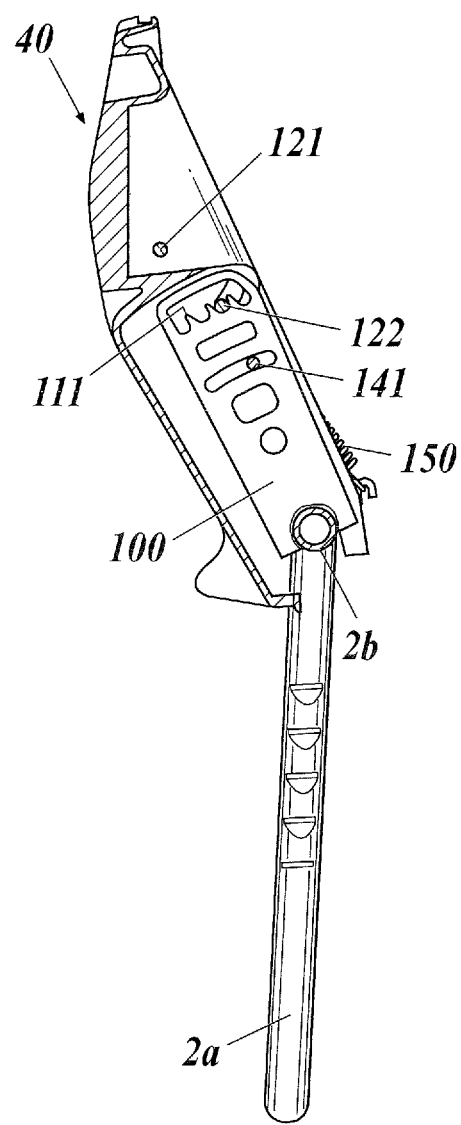
FIG. 12 illustrates another mode of the front segment of the headrest body during operation.

When the engaging segment 122 goes above the upper edge of the rearmost engaging tooth 111, the engaging segment 122 is urged by the biasing force of the helical torsion coil spring 130 and moves toward the bottom of the second-rearmost concave groove 112 by itself. The engaging segment 122 then fits in the bottom of the second-rearmost concave groove 112 and engages with the rearmost engaging tooth 111, as illustrated in FIG. 12.

Specifically, the ascending engaging segment 122 starts to descend when going above the upper edge of the rearmost engaging tooth 111.

In other words, the engaging segment 122 starts to descend upon fitting in the second-rearmost concave groove 112 and engaging with the rearmost engaging tooth 111.

The headrest body 20 can thus be moved forward stepwise. The headrest body 20 can be locked in one of the several positions in the front-rear direction relative to the locking bracket 100.

Figure 13:
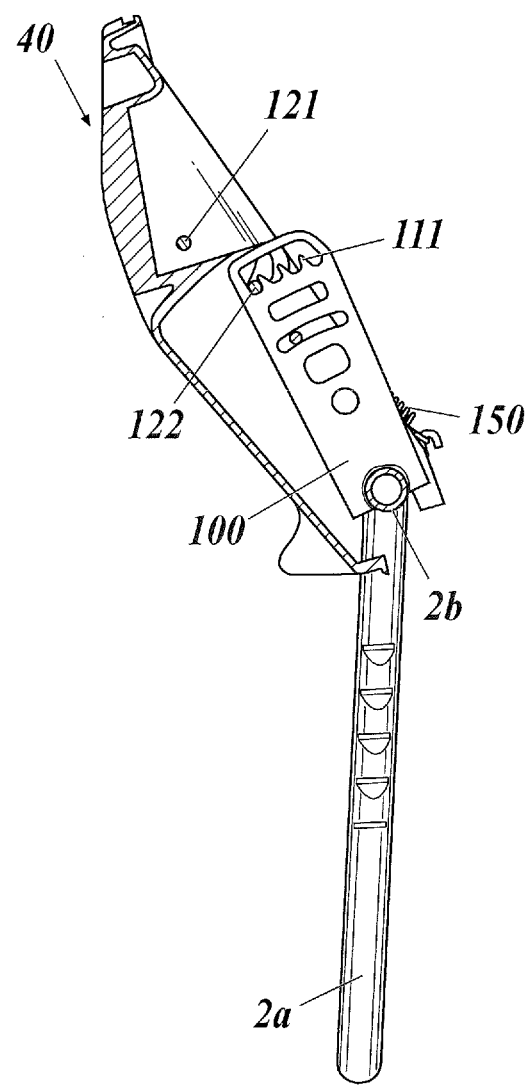
FIG. 13 illustrates another mode of the front segment of the headrest body during operation.

FIG. 13 illustrates the headrest body 20 in the frontmost position during the front-rear movement. In this position, the engaging segment 122 fits in the frontmost concave groove 112 and engages with the frontmost engaging tooth 111.

To return the headrest body 20 in the frontmost position to the normal position, the button 60 is pushed and thus the supported segment 121 is moved along its axis. In other words, the locking member 120 is moved in the direction in which the helical torsion coil spring 130 is compressed.

The movement of the supported segment 121 releases the engaging segment 122 from the ratchet 110.

Consequently, the engaging segment 122 engages with none of the engaging teeth 111 of the ratchet 110, and hence, the headrest body 20 is urged rearward by the biasing force of the biasing members 150 and moves to the rearmost position.

After the return of the headrest body 20 to the rearmost position, the engaging segment 122 is inserted into the ratchet 110 again by the biasing force of the helical torsion coil spring 130, and then fits in the rearmost concave groove 112 as illustrated in FIG. 10. The headrest body 20 thus returns to the normal position.

The guide member 141 also moves along the extending direction of the guide recess 140 in response to the movement of the headrest body 20.

In specific, in the normal position of the headrest body 20, the guide member 141 is disposed at the rear end of the guide recess 140 in the extending direction thereof, as illustrated in FIG. 10. In the frontmost position of the headrest body 20, the guide member 141 is disposed near the front end of the guide recess 140 in the extending direction thereof, as illustrated in FIG. 13.

If the operator tries to move the headrest body 20 forward from the frontmost position, the engaging segment 122 leaves the bottom of the frontmost concave groove 112, and slides and moves upward along the front end of the ratchet 110.

If the headrest body 20 is further forced to move forward from this state, the guide member 141 comes into contact with the front end of the guide recess 140 in the extending direction thereof. This configuration keeps the headrest body 20 from moving forward.

The above mechanisms can operate the headrest.

The headrest body 20 as described above should not be construed to limit to the present embodiment, and may be appropriately modified within the gist of the present invention.

The shifting mechanism as described above should not be construed to limit to the present embodiment, and may be appropriately modified within the gist of the present invention. Although, in the shifting mechanism of the present embodiment, the position of the headrest body 20 is adjusted by pivoting the headrest body 20 in the front-rear direction, the position of the headrest body 20 may be adjusted by moving the headrest body 20 in the front-rear direction According to the present embodiment, the bottom 10a of the headrest 10 has the recesses 30a for accommodating the heads 3a of the headrest guides 3, and the surfaces of the recesses 30a are set to be apart from the heads 3a of the headrest guides 3. This configuration can avoid a damage or abnormal noise due to the contact between the headrest 10 and the heads 3a of the headrest guides 3.

The paths of the surfaces of the recesses 30a during the front-rear movement of the headrest 10 are set to be apart from the heads 3a of the headrest guides 3. This configuration can prevent interference between the headrest 10 and the heads 3a of the headrest guides 3 during the front-rear movement of the headrest 10, and can thus avoid a damage or abnormal noise due to the contact between the headrest 10 and the heads 3a of the headrest guides 3.

Since the heads 3a of the headrest guides 3 can be respectively accommodated in the recesses 30a, the increase in the size of the headrest 10 can be suppressed.

The headrest 10 includes the headrest body 20 including the shifting mechanism for moving the headrest 10 in the front-rear direction relative to the headrest pillar 2, and the bottom cover 30 that is disposed on the bottom 20a of the headrest body 20 and includes the recesses 30a accommodating the heads 3a of the headrest guides 3. The bottom cover 30 can avoid a damage or abnormal noise due to the contact between the bottom cover 30 and the heads 3a of the headrest guides 3 while protecting or decorating the bottom 20a of the headrest body 20.

The bottom cover 30 is disposed to overlap the bottom 20a of the headrest body 20 in a state where the edge of the covering material 20b covering the headrest body 20 is held between the bottom cover 30 and the bottom 20a. The edge of the covering material 20b is thus sealed between the bottom cover 30 and the bottom 20a of the headrest body 20 to prevent leakage of a filling resin, such as urethane, functioning as a cushion pad.

This configuration can satisfy the requirement for ready sealing of the edge of the covering material 20b on the bottom 10a of the headrest 10.

The bottom 20a of the headrest body 20 has the first openings 23, the bottom cover 30 has the second openings 33 and the plugs 34, and the recesses 30a are disposed below the respective plugs 34. This configuration ensures alignment among the first openings 23, the second openings 33, the plugs 34, and the recesses 30a of the bottom cover 30, thereby hardly causing troubles during the mounting of the bottom cover 30 onto the bottom 20a of the headrest body 20 and the front-rear movement of the headrest body 20.

This configuration can satisfy the requirement for prevention of troubles during the mounting of the bottom cover 30 onto the bottom 20a of the headrest body 20 and the front-rear movement of the headrest body 20.

The first openings 23 are formed in the bottom 20a of the headrest body 20 corresponding to the respective support posts 2a of the headrest pillar 2, and the second openings 33 and the plugs 34 formed in the bottom cover 30 corresponding to the respective support posts 2a. This configuration ensures alignment among the first openings 23, the second openings 33, the plugs 34, and the recesses 30a of the bottom cover 30 while the headrest pillar 2 is constituted so as to include multiple supporting post 2a, thereby hardly causing troubles during the mounting of the bottom cover 30 onto the bottom 20a of the headrest body 20 and the front-rear movement of the headrest body 20.

This configuration can satisfy the requirement for prevention of troubles during the mounting of the bottom cover 30 onto the bottom 20a of the headrest body 20 and the front-rear movement of the headrest body 20.

The bottom cover 30 further includes the reinforcing member 36 provided between one plug 34 and the other plug 34. The reinforcing member 36 reinforces the portion of the bottom cover 30 between the one plug 34 and the other plug 34 and can thus increase the rigidity of the bottom cover 30.

This configuration can satisfy the requirement for high rigidity of the bottom cover 30 mounted on the bottom 20a of the headrest body 20.

The reinforcing member 36 is disposed so as to reach the peripheral edges of the third openings 35 in the upper portions of the tubular plugs 34. The reinforcing member 36 reinforces the plugs 34 and can thus increase the rigidity of a larger area of the bottom cover 30.

This configuration can satisfy the requirement for high rigidity of the bottom cover 30 mounted on the bottom 20a of the headrest body 20.

The middle portion 37 protrudes in comparison to the bottom surfaces of the recesses 30a of the bottom cover 30. If the headrest body 20 is moved downward to be in contact with the top of the seat back 1 and is pushed against the seat back 1, the middle portion 37 first comes into contact with the top of the seat back 1. This configuration can reduce the risk of contact between the bottom surfaces of the recesses 30a and the heads 3a of the headrest guides 3.

INDUSTRIAL APPLICABILITY

The headrest according to the present invention is applicable as a headrest for supporting the head of the occupant of the seat.

REFERENCE SIGN LIST 1 seat back
2 headrest pillar 2a support post
2b horizontal segment
3 headrest guide
3a head
10 headrest
10a bottom
20 headrest body
20a bottom
20b covering material
21 inclined surface
22 ceiling surface
23 first opening
30 bottom cover
30a recess
31 inclined-surface abutting segment
32 ceiling-surface abutting segment
33 second opening
34 plug
35 third opening
36 reinforcing member
37 middle portion
40 front segment
42 button holder
43 reception cylinder
44 cylinder body
45 flange
50 rear segment
52 holder cover
60 button
70 button body
71 button face
72 protrusion
72a retaining portion
72b step
73 engaging member
80 retainer
81 cylinder
81a step
81b slit
81c end
82 flange
83 internal side wall
83a through hole
90 biasing member
100 locking bracket
110 ratchet
111 engaging tooth
112 groove
120 locking member
121 supported segment
122 engaging segment
123 middle segment
130 biasing member
140 guide recess
141 guide member
150 biasing member

The invention claimed is:

1. A headrest adapted to be mounted to a top of a seat back with a headrest pillar and a headrest guide that has a head, height-adjustably supports the headrest pillar, and is attached to the seat back such that a head of the headrest guide is exposed from the top of the seat back, the headrest comprising:

a recess on a bottom of the headrest, the recess facing the head of the headrest guide when the headrest is mounted to the top of the seat back;
a headrest body comprising a shifting mechanism for moving the headrest in the front-rear direction relative to the headrest pillar; and
a bottom cover disposed on the bottom of the headrest body, the bottom cover including the recess,
wherein
a surface of the recess is set to be separate from the head of the headrest guide,
the bottom of the headrest body has a first opening to introduce the headrest pillar into the headrest body,
the bottom cover has a second opening aligned with the first opening such that the headrest pillar extends through the second opening,
the bottom cover comprises a tubular plug standing upwards from a peripheral edge of the second opening, the plug being inserted into the headrest body through the first opening, and
the recess is disposed below the plug.

2. The headrest according to claim 1, wherein
the headrest is configured such that a position of the headrest is adjustable in a front-rear direction, and
a path of the surface of the recess during a movement of the headrest in the front-rear direction is set to be separate from the head of the headrest guide.

3. The headrest according to claim 1, wherein the head of the headrest guide is accommodated in the recess.

4. The headrest according to claim 1, comprising a covering material covering the headrest body, wherein
the bottom cover is disposed to overlap the bottom of the headrest body in a state where an edge of the covering material is held between the bottom cover and the bottom of the headrest body.

5. The headrest according to claim 1, wherein
the headrest pillar comprises a plurality of support posts,
a plurality of the first openings are provided, the first openings being aligned with the respective support posts and provided in the bottom of the headrest body,
a plurality of the second openings are provided, the second openings being aligned with the respective support posts and provided in the bottom cover, and
a plurality of the plugs are provided, the plugs being aligned with the respective support posts and provided in the bottom cover.

6. The headrest according to claim 5, wherein
a plurality of the recesses are provided, and
the bottom cover has a middle portion between one recess below the one plug and another recess below the another plug, the middle portion protruding from the bottom surfaces of the recesses of the bottom cover.

7. The headrest according to claim 5, wherein the bottom cover further comprises a reinforcing member between one plug and another plug.

8. The headrest according to claim 7, wherein
the reinforcing member is disposed to reach peripheral edges of third openings in the respective upper portions of the tubular plugs.

\* \* \* \* \*